United States Patent
Shih (12) United States Patent
(10) Patent No.: US 8,166,302 B1
(45) Date of Patent: Apr. 24, 2012

(54) STORAGE DEVICE WITH TRACEABLE WATERMARKED CONTENT

(75) Inventor: Yin Lung Shih, Saratoga, CA (US)

(73) Assignee: Seagate Technology LLC, Cupertino, CA (US)

( * ) Notice: Subject to any disclaimer, the term of this patent is extended or adjusted under 35 U.S.C. 154(b) by 3310 days.

(21) Appl. No.: 10/131,171

(22) Filed: Apr. 23, 2002

(51) Int. Cl.
*H04L 9/32* (2006.01)

(52) U.S. Cl. ............ 713/176; 713/180; 726/26; 726/30; 382/100; 711/111; 711/112

(58) Field of Classification Search .................... 380/22, 380/277–278, 238; 713/188, 193, 176, 180; 709/214, 225; 710/5, 68, 74; 711/156, 163, 711/111–112; 382/100; 707/9, 100, 101; 705/50–51; 726/26, 30
See application file for complete search history.

(56) References Cited

U.S. PATENT DOCUMENTS

| | | | | |
|---|---|---|---|---|
| 5,235,641 A * | 8/1993 | Nozawa et al. | ............... | 713/193 |
| 5,748,744 A * | 5/1998 | Levy et al. | ...................... | 380/52 |
| 5,784,461 A * | 7/1998 | Shaffer et al. | .................... | 705/51 |
| 6,195,732 B1 * | 2/2001 | Adams et al. | .................. | 711/156 |
| 6,421,450 B2 * | 7/2002 | Nakano | .......................... | 382/100 |
| 6,487,301 B1 * | 11/2002 | Zhao | .............................. | 382/100 |
| 6,611,607 B1 * | 8/2003 | Davis et al. | .................... | 382/100 |
| 6,636,966 B1 * | 10/2003 | Lee et al. | ....................... | 713/165 |
| 6,647,388 B2 * | 11/2003 | Numao et al. | .................... | 707/9 |
| 6,772,340 B1 * | 8/2004 | Peinado et al. | ............... | 713/168 |
| 6,823,398 B1 * | 11/2004 | Lee et al. | .......................... | 710/5 |
| 6,827,257 B2 * | 12/2004 | Kobayashi et al. | ........... | 235/375 |
| 6,873,975 B1 * | 3/2005 | Hatakeyama et al. | .......... | 705/51 |
| 6,983,371 B1 * | 1/2006 | Hurtado et al. | ............... | 713/189 |
| 2001/0022848 A1 * | 9/2001 | Rhoads | ......................... | 382/100 |
| 2001/0056384 A1 * | 12/2001 | Matsumura | ..................... | 705/27 |
| 2002/0037091 A1 * | 3/2002 | Terasaki | ........................ | 382/100 |
| 2002/0144130 A1 * | 10/2002 | Rosner et al. | ................. | 713/188 |
| 2002/0156797 A1 * | 10/2002 | Lee et al. | ....................... | 707/200 |
| 2003/0018917 A1 * | 1/2003 | Brown, Sr. | ..................... | 713/201 |

\* cited by examiner

*Primary Examiner* — Yin-Chen Shaw
(74) *Attorney, Agent, or Firm* — David K. Lucente (57) ABSTRACT

A storage device responds to a content request by watermarking the content and providing the watermarked content to the requester. The watermarked content uniquely identifies the storage device so that the storage device is traceable from the watermarked content.

100 Claims, 4 Drawing Sheets

FIG. 1

STORAGE DEVICE WITH TRACEABLE WATERMARKED CONTENT

FIELD OF THE INVENTION

The present invention relates generally to storage devices, and more particularly to a storage device with watermarked content.

BACKGROUND OF THE INVENTION

Audio-video image information (A/V) content is digitized to reduce quality degradation and mass-duplicated in digital form for consumer use by end users. However, the digital copies are vulnerable to mass distribution of bootleg copies, thereby violating the content owner's copyright rights. Moreover, the bootleg copies are nearly impossible to trace to the copyright infringer.

High value A/V content such as movies and music is encrypted to prevent unauthorized access. High value A/V content can be presented in analog form and encrypted/decrypted in a protected single package integrated circuit system to preclude snooping attacks on unprotected A/V data streams. However, managing the analog signals is inconvenient.

High value A/V content is often provided to end users as digitized encrypted content in a storage device such as a disk drive. Thereafter, the storage device decrypts the encrypted content into unprotected decrypted content for the end user. However, there is no way to identify and trace the particular storage device that decrypts the encrypted content, particularly if the decrypted content is used illicitly to generate bootleg copies.

There is a need for tracking copies of content distributed to end users from a storage device. There is also a need for identifying the storage device from which a copy of the content is made. There is also a need for providing content owners with a traceable form of the content and with identification of the storage device that furnishes bootleg copies of the content.

SUMMARY OF THE INVENTION

The present invention satisfies these needs. A storage device responds to a content request by watermarking the content and providing the watermarked content to the requester. The watermarked content uniquely identifies the storage device so that the storage device is traceable from the watermarked content.

In an embodiment, the storage device performs the watermarking automatically without a watermark request from the requester, and does not send the content to the requester unless the content is watermarked.

In another embodiment, the storage device receives encrypted content, and then, in response to the content request, sends identification information to a remote authorization source such as a Web site, receives a decryption key from the remote authorization source, decrypts the encrypted content using the decryption key to generate the content and then watermarks the content.

In another embodiment, the watermarked content includes a watermark that is embedded in and hard to detect in the content, the watermark alters samples of an analog signal that represents the watermarked content and the altered samples indicate the watermark.

In another embodiment, the requester is a host computer, the storage device is a disk drive, the watermark is a serial number of the disk drive and the content is audio-video data.

Advantageously, the content can be mass distributed to end users in generic form, and the storage devices rather than a centralized host system can impose unique watermarks on the content. Thereafter, the released watermark content can be analyzed to identify the storage device as the source of the watermarked content.

BRIEF DESCRIPTION OF THE DRAWINGS

These and other features, aspects and advantages of the present invention will become better understood with regard to the following description, appended claims and accompanying drawings where:

To facilitate understanding, identical reference numerals have been used, where possible, to designate identical elements that are common throughout the drawings.

DETAILED DESCRIPTION OF THE INVENTION

Figure 1:
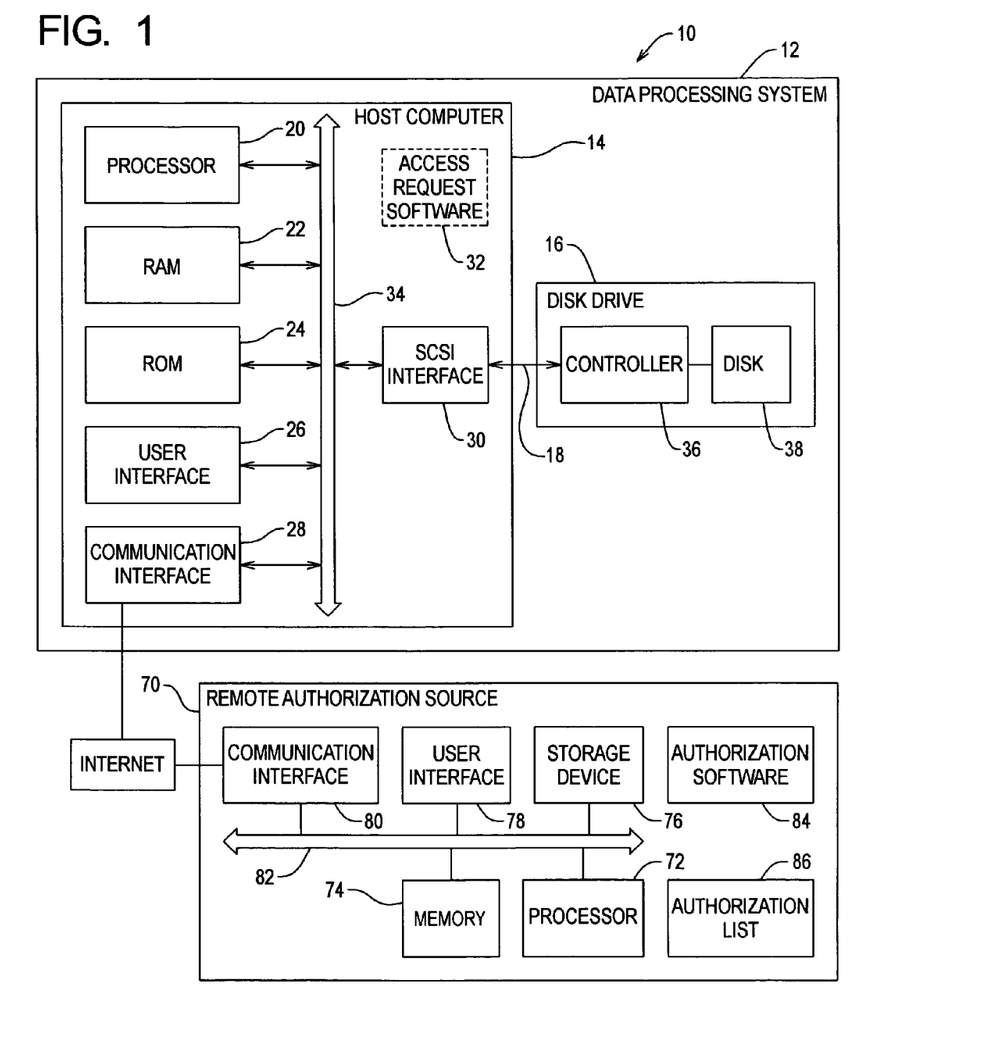
FIG. 1 shows a computer system that includes a data processing system and a remote authorization source in which the data processing system includes a host computer and disk drive, the data processing system and the remote authorization source are connected by the Internet and the host computer and the disk drive are connected by a bus.

FIG. 1 shows a computer system 10 in which the present invention can be implemented. The computer system 10 includes a data processing system 12 such as a personal computer. The data processing system 12 includes a host computer 14, a disk drive 16 and a SCSI bus 18.

The host computer 14 includes a processor 20, a random access memory (RAM) 22, a read only memory (ROM) 24, a user interface 26, a communication interface 28, a SCSI interface 30, access request software 32 and a system bus 34.

The disk drive 16 includes a controller 36 and a disk 38. The controller 36 interfaces with the host computer 14 via the SCSI bus 18 and controls the disk drive operations such as data transfer to and from the disk 38. The disk 38 is a magnetic storage media.

Figure 2:
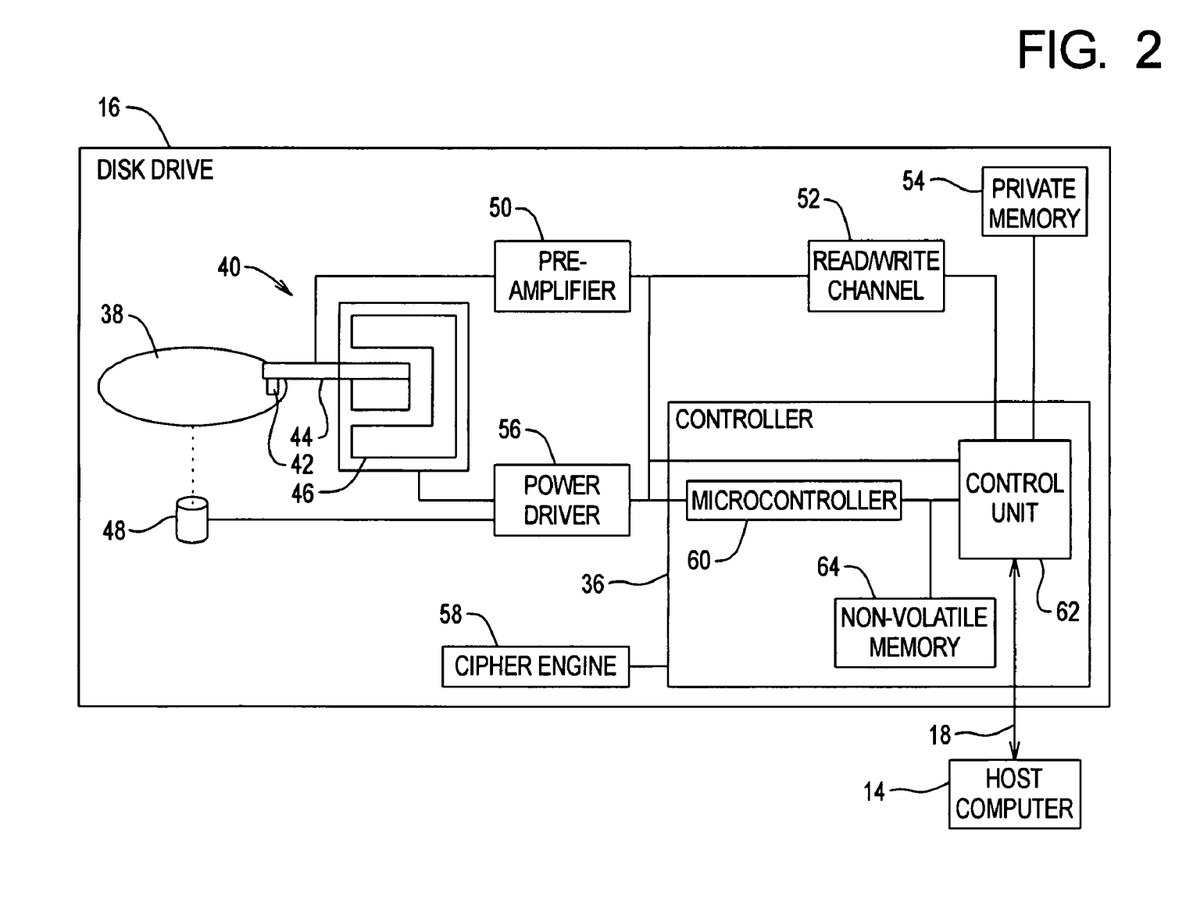
FIG. 2 shows the disk drive in more detail.

FIG. 2 shows the disk drive 16 in more detail. The disk drive 16 includes, in addition to the controller 36 and the disk 38, an actuator assembly 40 that includes a magneto-resistive (MR) head 42, a support arm 44 and a voice coil motor (VCM) 46. The disk drive 16 also includes a spindle motor 48, a preamplifier 50, a read/write channel 52, a private memory 54, a power driver 56 and a cipher engine 58. Furthermore, the controller 36 includes a microcontroller 60, a control unit 62 and a non-volatile memory 64.

The head 42 reads from and writes to the disk 38 for data storage and retrieval, the support arm 44 supports the head 42, the VCM 46 moves the head 42 across the tracks of the disk 38 and maintains the head 42 over a target track of the disk 38, and the spindle motor 48 rotates the disk 38. The preamplifier 50 amplifies the read and write signals to and from the head 42. The channel 52 encodes and decodes data transferred to and from the disk 38 and decodes servo information. The private memory 54 is accessible only by the disk drive 16. The power driver 56 drives the VCM 46 and the spindle motor 48. The cipher engine 58 decrypts encrypted data using a decryption key. The microcontroller 60 controls access to the disk 38, and the control unit 62 provides general control of the components of the disk drive 16 and the interface to the host computer 14. The non-volatile memory 64 can be ROM or EEPROM.

Figure 3:
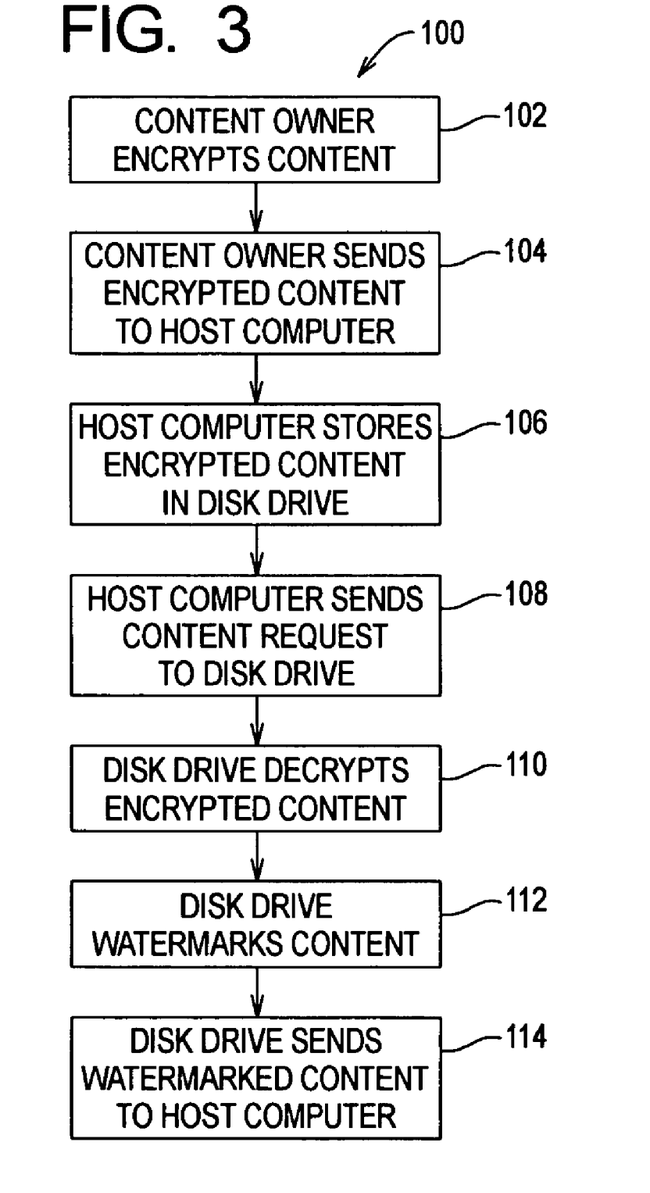
FIG. 3 shows a flow chart for the disk drive providing watermarked content to the host computer.

FIG. 3 shows a flow chart 100 for the disk drive 16 providing traceable watermarked content to the host computer 14.

The content owner encrypts digital audio-video content (step 102) and sends the encrypted content in generic encrypted form (non-unique, non-watermarked) to the host computer 14 (step 104). The host computer 14 sends the encrypted content across the SCSI bus 18 to the disk drive 16, and the disk drive 16 stores the encrypted content on the disk 38 (step 106).

The host computer 14 sends a content request for the content across the SCSI bus 18 to the disk drive 16 (step 108). The content request is merely a read command generated by the end user to obtain the content. Thus, the content request does not include a watermark request or in any way indicate that a watermarking operation should be performed on the content.

The disk drive 16 responds to the content request by decrypting the encrypted content (step 110). In particular, the controller 36 transfers the encrypted content from the disk 38 to the cipher engine 58, the controller 36 also provides a decryption key to the cipher engine 58, the cipher engine 58 decrypts the encrypted content using the decryption key to generate the content, and the controller 36 stores the content in the private memory 54.

The disk drive 16 also responds to the content request by watermarking the (decrypted) content to generate watermarked content (step 112). The watermarking embeds a watermark in the content that identifies the disk drive 16. The watermark is a hidden tag or signature information that uniquely stamps the content with unique identification information such as the serial number of the disk drive 16. As a result, the disk drive 16 is identified by and traceable from the watermarked content.

The disk drive 16 further responds to the content request by sending the watermarked content across the SCSI bus 18 to the host computer 14 (step 114).

The disk drive 16 automatically watermarks the content and sends the watermarked content to the host computer 14 in response to the content request even though the disk drive 16 does not receive a watermark request from the host computer 14 or any other external device. The disk drive 16 watermarks the content regardless of whether the content is received and stored in encrypted form and decrypted before the watermarking. Furthermore, the disk drive 16 does not release the content to the host computer 14 unless the disk drive 16 watermarks the content with unique identification information that identifies the disk drive 16. As a result, the disk drive 16 ensures that the content sent to the host computer 14 in response to the content request is traceable to the disk drive 16, regardless of whether the host computer 14 expects to receive the content in the generic (non-traceable) form that was sent to and stored in the disk drive 16.

The content owner specifies the watermarking operation for the disk drive 16, and the disk drive 16 watermarks the content in this manner. The content owner can then detect the watermark in the watermarked content released by the disk drive 16 since the content owner knows how the content is watermarked by the disk drive 16.

The content owner can detect the watermark in a sampled analog signal that represents the watermarked content. The samples include data samples and noise samples. In an analog signal that represents the content, the data samples represent the content and the noise samples are random noise. However, the watermark can adjust the analog signal by imposing slight proprietary variations on the noise samples so that the noise samples represent the watermark. The altered noise samples appear as noise to others but can be recognized by the content owner as the watermark.

For example, the watermark alters the noise samples so that every $5^{th}$ sample has a value of "1". As another example, the watermark alters the noise samples (16 bits each) so that the least significant bit of every $5^{th}$ sample is "1". As another example, the watermark alters the noise samples so that the $5^{th}$ sample in every 600 samples is a digit of the serial number. As another example, the watermark alters the noise samples so that every $5^{th}$ sample in every 600 samples is different than the $5^{th}$ sample in the previous 600 samples, for instance by switching back and forth between "0" and "1" as the value of the $5^{th}$ sample in every 600 samples.

The watermark is hidden in and hard to detect in the watermarked content. However, the content owner can detect the watermark from the watermarked content and identify the disk drive 16 from the watermark since each disk drive has a unique serial number. Moreover, the host computer 14 cannot disable the watermarking or remove the watermark from the watermarked content. As a result, the watermark enables the content owner to identify the disk drive 16 as the source of bootleg copies of the content, and in turn, identify the end user that owns the disk drive 16 as the illicit copier.

The present invention includes an authentication process to determine if the host computer 14 (or end user) is authorized to obtain the content from the disk drive 16. The authorization process requires the disk drive 16 to obtain the decryption key from a remote authorization source outside the data processing system 12, and the remote authorization source releases the decryption key to the disk drive 16 only if the host computer 14 is authorized to access the content. The authentication process supplements the watermarking to provide additional security protection for the content owner. The authentication process prevents unauthorized end users from obtaining the content in the disk drive 16, and the watermarking prevents end users that bootleg the content in the disk drive 16 from remaining anonymous.

Referring again to FIG. 1, the computer system 10 also includes a remote authorization source 70 that is remote to the data processing system 12. The remote authorization source 70 includes a processor 72, a memory 74, a storage device 76, a user interface 78, a communication interface 80, a system bus 82, authorization software 84 and an authorization list 86.

The remote authorization source 70 is a Web site that is maintained, for instance, by the content owner or the manufacturer of the disk drive 16. The remote authorization source 70 is connected to the host computer 14 by the Internet. The authorization list 86 contains access verification information that indicates whether the host computer 14 (or end user) is authorized to access the content from the disk drive 16.

Figure 4:
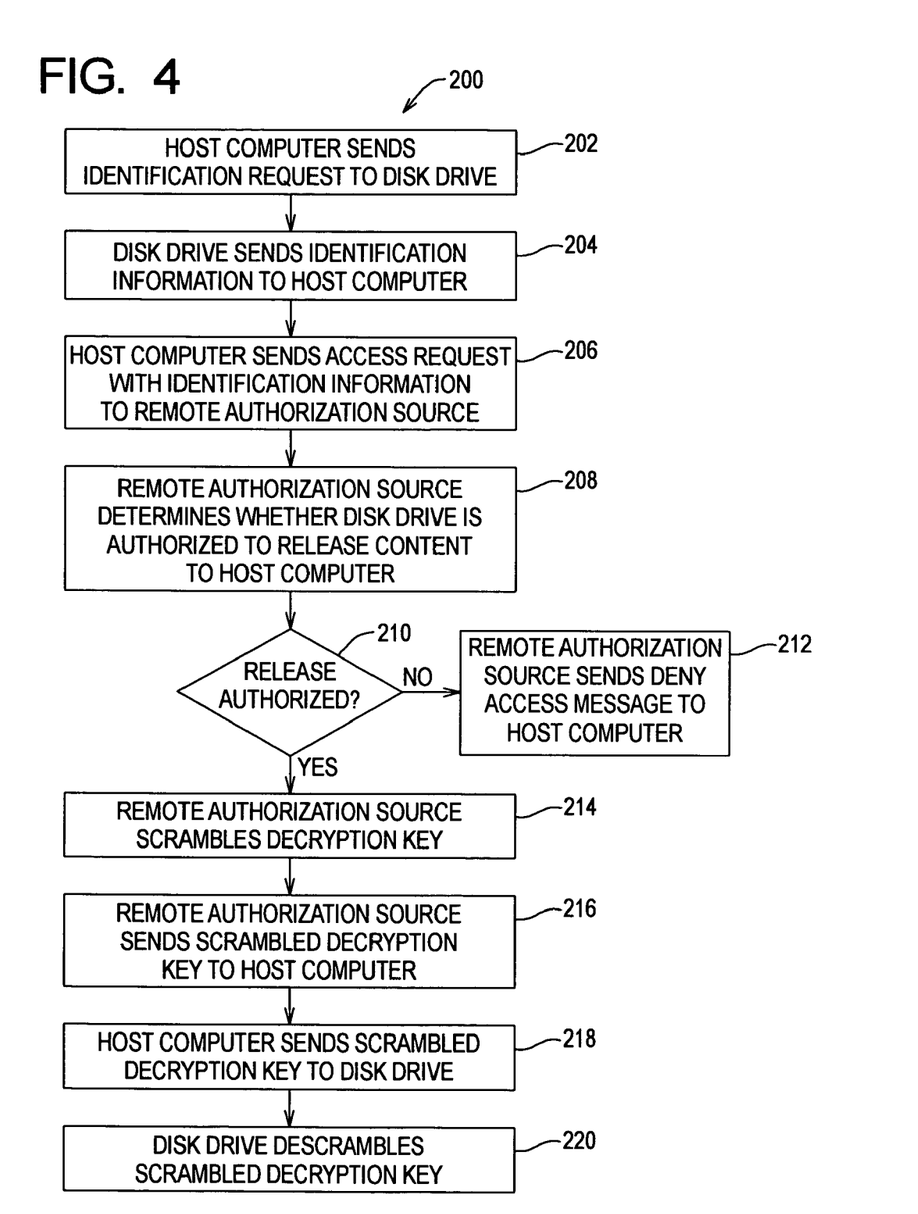
FIG. 4 shows a flow chart for the disk drive obtaining a decryption key from the remote authorization source.

FIG. 4 shows a flow chart 200 for the disk drive 16 obtaining the decryption key from the remote authorization source 70. The flow chart 200 is implemented during step 110 in response to the content request.

The host computer 14 sends an identification request across the SCSI bus 18 to the disk drive 16 (step 202), and in response, the disk drive 16 sends unique identification information (such as the serial number) that identifies the disk drive 16 across the SCSI bus 18 to the host computer 14 (step 204).

The host computer 14 sends an access request that includes the identification information across the Internet to the remote authorization source 70 (step 206), and in response, the remote authorization source 70 records the received identification information for future transactions or usage history and determines whether the disk drive 16 is authorized to release the content (steps 208 and 210). The remote authorization source 70 makes this determination using the received identification information and the authorization list 86.

If the remote authorization source 70 determines that the disk drive 16 is not authorized to release the content, then the remote authorization source 70 returns a deny access message across the Internet to the host computer 14, thereby rejecting the content request (step 212).

Otherwise, if the remote authorization source 70 determines that the disk drive 16 is authorized to release the content, then the remote authorization source 70 obtains the decryption key from the authorization list 86 and scrambles the decryption key using the identification information as a scramble key (214), the remote authorization source 70 sends the scrambled decryption key across the Internet to the host computer 14 (step 216), the host computer 14 sends the scrambled decryption key across the SCSI bus 18 to the disk drive 16 (step 218), and the disk drive 16 descrambles the scrambled decryption key in the cipher engine 58 using the identification information in the disk drive 16 as a descramble key to generate the decryption key (step 220).

The authentication process is optional. Likewise, the remote authorization source 70 is optional, the Internet communication is optional, the identification information with the access request is optional, the identification information matching the watermark and/or the serial number is optional, and scrambling and descrambling the decryption key is optional.

The access request can include financial consideration such as credit card information, and the remote authorization source 70 can deny the access request unless the financial consideration is adequate. The scrambling can include hashing, jumbling, mapping, encoding, encryption and ciphering algorithms that are not clear from samples of the scrambled and unscrambled data. Furthermore, in addition to the decryption key, the remote authorization source 70 can provide additional identifying data to the disk drive 16 that is included in the watermark.

Multiple watermarks can be superimposed on one another as long as the watermarks do not significantly modify or degrade the content. For example, the content owner can watermark the content with a first (additional) watermark, the disk drive 16 can watermark the content received from the content owner (containing the first watermark) with a second (disk drive unique) watermark, and then the disk drive 16 can send the watermarked content (including the first and second watermarks) to the host computer 14. Even though the watermarked content includes the first watermark before the content is sent to the disk drive, and the watermarked content includes the first and second watermarks, the to second watermark in the watermarked content is uniquely detectable and traceable to the disk drive 16 apart from the first watermark.

The disk drive 16 can use a wide variety of watermarking operations to watermark the content. The watermarking operations are usually based on embedding and detecting pseudo-random noise added to digital forms of analog data. Preferably, the watermarking operation (1) is compatible with the content and has low observability to avoid noticeably degrading the content, (2) has high survivability with normal processing of the content (such as frequency emphasis/de-emphasis with audio content or mild rotation or scaling with video content), (3) conveys the necessary bits of information with sufficient redundancy to be easily survivable with modest editing, (4) is compatible with other watermarking operations (such as SDMI) which may also be imposed on the content, and (5) has low false positive characteristics.

The disk drive 16 can watermark a selected portion of the content. For example, the disk drive 16 can receive and store encrypted high value A/V content that includes audio tracks, then decrypt the encrypted content, then watermark the audio tracks, and then send the watermarked content (in which only the audio tracks are watermarked) to the host computer 14.

The content can be a wide variety of digital data such as audio, video, audio-video, images, recordings, computer programs, MP3 and MPEG. In addition, encrypted encoded content can be sent to and stored in the disk drive 16, and then, after decrypting the encrypted encoded content to generate the encoded content, the disk drive 16 can decode the encoded content to generate the content and then watermark the content. Furthermore, after watermarking the content to generate the watermarked content, the disk drive 16 can encode the watermarked content to generate encoded watermarked content and then send the encoded watermarked content to the host computer 14. For example, the disk drive 16 can receive and store encrypted MPEG data, then decrypt the encrypted MPEG data, then watermark the MPEG data, then compress the watermarked MPEG data and then send the compressed watermarked MPEG data to the host computer 14.

The controller 36 can perform the decrypting, watermarking, decoding and encoding in real-time or as permitted by processing and memory resources. In most cases, the controller 36 can watermark, decode and encode audio and still-images in real-time. For example, Dolby AC-3, a sophisticated audio code, requires 50-75 MIPS to compress and 25 MIPS to decompress in real-time, and the microcontroller 60 can have a 33 to 66 MHz clock rate and similar MIPS range to this data. However, the controller 36 may need a more powerful microcontroller 60 and a larger non-volatile memory 64 to encode and decode moving-images within reasonable time constraints.

The data processing system 12 can include other storage devices besides the disk drive 16 that watermark the content, such as CD players, DVD players and VCRs. The data processing system 12 can include other buses (interfaces) besides the SCSI bus 18 between the host computer 14 and the disk drive 16, such as IDE/ATA and 1394 (Firewire) buses. The data processing system 12 can also include multiple host computers 14 and disk drives 16, in which each disk drive 16 applies its own unique watermark to the generic content received from the content owner. The host computer 14 and the remote authorization source 70 can have different architectures than those described above, and the disk drive 16 can have multiple disks 38.

The disk drive 16 can operate as described in the flow charts 100 and 200 by the microcontroller 60 executing program instructions stored in the private memory 54, or alternatively, by the controller 36 configured as an ASIC. Likewise, the host computer 14 can operate as described in the flow chart 200 by the processor 20 executing the access request software 32 stored in the RAM 22, and the remote authorization source 70 can operate as described in the flow chart 200 by the processor 72 executing the authorization software 84 stored in the memory 74.

Although the present invention has been described in considerable detail with regard to the preferred versions thereof, other versions are possible. Therefore, the appended claims should not be limited to the descriptions of the preferred versions contained herein.

What is claimed is:

1. In a storage device including a storage media that stores content, a method for providing a uniquely identifiable watermarked content, comprising:

receiving a content request for the content from a requester;

watermarking the content to generate watermarked content that includes the content in response to the request, wherein the watermarked content is uniquely identifiable to the storage device as a result of the watermarking and the storage device performs the watermarking automatically without a watermark request from the requester; and providing the watermarked content to the requester.

2. The method of claim 1, wherein the watermarking includes embedding unique identifying information of the storage device in the content.

3. The method of claim 2, wherein the unique identifying information is a serial number of the storage device.

4. The method of claim 2, wherein the unique identifying information is hidden in the watermarked content.

5. The method of claim 2, wherein the unique identifying information is hard to detect in the watermarked content.

6. The method of claim 1, including receiving encrypted content from an external source, decrypting the encrypted content using a decryption key to generate the content and then watermarking the content.

7. The method of claim 6, including obtaining the decryption key from a remote authorization source.

8. The method of claim 6, including decrypting the encrypted content in response to the content request.

9. The method of claim 1, wherein the storage device is a disk drive and the storage media is a disk.

10. The method of claim 1, including determining if the requester is authorized to receive the content, and if not authorized, then rejecting the content request.

11. The method of claim 10, including determining if the requester is authorized to receive the content by communicating with a remote authorization source in response to the content request.

12. In a data processing system including a host computer and a storage device, wherein the storage device includes a storage media that stores content, and the host computer and the storage device communicate with one another across a bus, a method for providing uniquely identifiable content from the storage device to the host computer, comprising:

the host computer sending a content request for the content to the storage device; and in response to the content request, and without a watermark request, the storage device (i) watermarking the content to generate watermarked content that is uniquely identifiable to the storage device as a result of the watermarking, and (ii) sending the watermarked content to the host computer.

13. The method of claim 12, wherein the watermarking includes embedding unique identifying information of the storage device in the content.

14. The method of claim 13, wherein the unique identifying information is a serial number of the storage device.

15. The method of claim 13, wherein the unique identifying information is hidden in the watermarked content.

16. The method of claim 13, wherein the unique identifying information is hard to detect in the watermarked content.

17. The method of claim 12, including:

an external source sending encrypted content to the storage device;

the storage device decrypting the encrypted content using a decryption key to generate the content in response to the content request; and then the storage device watermarking the content.

18. The method of claim 17, including:

the host computer obtaining the decryption key from a remote authorization source; and the host computer sending the decryption key to the storage device.

19. The method of claim 18, including:

the storage device sending unique identifying information of the storage device to the host computer;

the host computer sending the unique identifying information to the remote authorization source;

the remote authorization source sending the decryption key to the host computer in response to the unique identifying information; and the host computer sending the decryption key to the storage device.

20. The method of claim 19, including:

the remote authorization source scrambling the decryption key using the unique identifying information as a scrambling key to generate a scrambled decryption key;

the remote authorization source sending the scrambled decryption key to the host computer;

the host computer sending the scrambled decryption key to the storage device; and the storage device unscrambling the scrambled decryption key using the unique identifying information as a descrambling key to generate the decryption key.

21. The method of claim 20, wherein the watermarking includes embedding the unique identifying information in the content.

22. The method of claim 12, wherein the host computer is a personal computer and the bus is a SCSI bus, an ATA bus or a 1394 bus.

23. The method of claim 12, wherein the storage device is a disk drive and the storage media is a disk.

24. The method of claim 12, including the storage device determining if the host computer is authorized to receive the content, and if not authorized, then rejecting the content request.

25. The method of claim 12, including the host computer determining if the storage device is authorized to provide the content, and if not authorized, then rejecting the content request.

26. The method of claim 12, including an owner of the content tracing the watermarked content to the storage device as a result of the watermarking.

27. The method of claim 12, excluding the storage device sending the content to the host computer unless the storage device watermarks the content.

28. A storage device, comprising:

storage media for storing data; and a controller that controls access to the storage media, wherein in response to a content request to transfer content stored in the storage media to a host computer, and without a request to watermark the content from the host computer or any other external device, the controller (i) watermarks the content to generate watermarked content that includes the content and is uniquely identifiable to the storage device as a result of the watermarking, and then (ii) provides the watermarked content to the host computer.

29. The storage device of claim 28, wherein the controller watermarks the content by embedding unique identifying information of the storage device in the content.

30. The storage device of claim 29, wherein the unique identifying information is a serial number of the storage device.

31. The storage device of claim 29, wherein the unique identifying information is hidden in and hard to detect in the watermarked content.

32. The storage device of claim 28, wherein the controller transfers encrypted content to the storage media before the content request, decrypts the encrypted content using a decryption key to generate the content in response to the content request and then watermarks the content.

33. The storage device of claim 32, wherein the controller obtains the decryption key from a remote authorization source.

34. The storage device of claim 33, wherein the remote authorization source is a Web site.

35. The storage device of claim 28, wherein the storage device is a disk drive and the storage media is a disk.

36. The storage device of claim 28, wherein the controller determines if the host computer is authorized to receive the content, and if not authorized, then rejects the content request.

37. The storage device of claim 36, wherein the controller determines if the host computer is authorized to receive the content by communicating with a remote authorization source in response to the content request.

38. The storage device of claim 37, wherein the remote authorization source is a Web site.

39. The storage device of claim 28, wherein the content includes an additional watermark and the watermarked content includes the additional watermark.

40. The storage device of claim 28, wherein the controller prohibits the storage device from sending the content to the host computer unless the controller watermarks the content.

41. A method of providing uniquely identifiable content from a disk drive to a host computer, comprising the following steps in the sequence set forth:
the disk drive receiving content from an external source;
the disk drive storing the content;
the host computer sending a content request for the content to the disk drive, wherein the content request does not include a watermark request;
the disk drive watermarking the content in response to the content request, thereby generating watermarked content that includes the content and a watermark that is embedded in the content and is detectable and uniquely identifies the disk drive so that the disk drive is traceable from the watermarked content; and
the disk drive sending the watermarked content to the host computer.

42. The method of claim 41, wherein:
the disk drive receives encrypted content from the external source;
the disk drive decrypts the encrypted content using a decryption key, thereby generating the content; and then
the disk drive watermarks the content.

43. The method of claim 42, wherein the disk drive decrypts the encrypted content in response to the content request.

44. The method of claim 42, wherein the disk drive obtains the decryption key from a remote authorization source.

45. The method of claim 44, wherein:
the host computer sends an access request to the remote authorization source;
the remote authorization source sends the decryption key to the host computer in response to the access request; and
the host computer sends the decryption key to the disk drive.

46. The method of claim 45, wherein:
the host computer sends identification information that uniquely identifies the disk drive to the remote authorization source; and
the remote authorization source sends the decryption key to the host computer in response to identification information.

47. The method of claim 46, wherein the identification information is the watermark.

48. The method of claim 46, wherein the identification information is a serial number of the disk drive.

49. The method of claim 46, wherein the identification information and the watermark are a serial number of the disk drive.

50. The method of claim 46, wherein the remote authorization source is a Web site.

51. The method of claim 45, wherein:
the remote authorization source sends a scrambled decryption key to the host computer in response to the access request;
the host computer sends the scrambled decryption key to the disk drive; and
the disk drive descrambles the scrambled decryption key using a descramble key, thereby generating the decryption key.

52. The method of claim 51, wherein the descramble key is the watermark.

53. The method of claim 51, wherein the descramble key is a serial number of the disk drive.

54. The method of claim 51, wherein the descramble key and the watermark are a serial number of the disk drive.

55. The method of claim 51, wherein the remote authorization source is a Web site.

56. The method of claim 45, wherein:
the host computer sends financial consideration to the remote authorization source; and
the remote authorization source sends the decryption key to the host computer in response to the financial consideration.

57. The method of claim 56, wherein the financial consideration includes credit card information.

58. The method of claim 45, wherein the remote authorization source is maintained by a content owner that owns the content.

59. The method of claim 58, wherein the content owner is the external source.

60. The method of claim 45, wherein the remote authorization source is maintained by a manufacturer of the disk drive.

61. The method of claim 41, wherein the watermark alters samples of an analog signal that represents the watermarked content and the altered samples indicate the watermark.

62. The method of claim 61, wherein the altered samples are every Nth sample of the analog signal.

63. The method of claim 62, wherein N is five.

64. The method of claim 61, wherein the altered samples are the Nth sample of every M samples of the analog signal.

65. The method of claim 64, wherein N is five and M is 600.

66. The method of claim 61, wherein the altered samples are in noise regions of the analog signal.

67. The method of claim 61, wherein the altered samples each have a value of one due to the watermark.

68. The method of claim 61, wherein the altered samples each have a least significant bit set to one due to the watermark.

69. The method of claim 61, wherein the altered samples are each a digit of the watermark.

70. The method of claim 61, wherein the altered samples are each different than the previous altered sample due to the watermark.

71. The method of claim 41, wherein the disk drive does not send the content to the host computer unless the watermark is embedded in the content.

72. The method of claim 41, wherein the host computer is a personal computer.

73. The method of claim 41, wherein the content is devoid of a watermark and the watermarked content is devoid of an additional watermark.

74. The method of claim 41, wherein the content includes an additional watermark before the content is sent to the disk drive, the watermarked content includes the watermark and the additional watermark, and the watermark is uniquely detectable and traceable apart from the additional watermark.

75. The method of claim 41, wherein the content is audio-video data.

76. The method of claim 41, wherein the content is a computer program.

77. The method of claim 41, wherein the watermark is a serial number of the disk drive.

78. The method of claim 41, wherein the watermark is hidden in and hard to detect in the watermarked content.

79. The method of claim 41, wherein the host computer and the disk drive are connected to one another by a bus.

80. The method of claim 79, wherein the bus is a SCSI bus, an ATA bus or a 1394 bus.

81. A method of providing uniquely identifiable content from a disk drive to a host computer, comprising the following steps in the sequence set forth:
the disk drive receiving encrypted content from an external source;
the disk drive storing the encrypted content on a disk;
the host computer sending a content request for the content to the disk drive, wherein the content request does not include a watermark request, and then, in response to the content request, and without a watermark request from an external device;
the disk drive decrypting the encrypted content using a decryption key, thereby generating the content;
the disk drive watermarking the content, thereby generating watermarked content that includes the content and a watermark that is embedded in the content and is detectable and uniquely identifies the disk drive so that the disk drive is traceable from the watermarked content; and
the disk drive sending the watermarked content to the host computer.

82. The method of claim 81, wherein the watermark alters samples in noise regions of an analog signal that represents the watermarked content and the altered samples indicate the watermark.

83. The method of claim 82, wherein the altered samples are every Nth sample of the analog signal.

84. The method of claim 82, wherein the altered samples are the Nth sample of every M samples of the analog signal.

85. The method of claim 82, wherein the altered samples each have a bit set due to the watermark.

86. The method of claim 81, wherein the disk drive does not send the content to the host computer unless the watermark is embedded in the content.

87. The method of claim 81, wherein the content is devoid of a watermark and the watermarked content is devoid of an additional watermark.

88. The method of claim 81, wherein the content includes an additional watermark before the content is sent to the disk drive, the watermarked content includes the watermark and the additional watermark, and the watermark is uniquely detectable and traceable apart from the additional watermark.

89. The method of claim 81, wherein the watermark is a serial number of the disk drive.

90. The method of claim 81, wherein the watermark is hidden in and hard to detect in the watermarked content.

91. A method of providing uniquely identifiable content from a disk drive to a host computer, comprising:
the disk drive receiving encrypted content from an external source;
the disk drive storing the encrypted content on a disk;
the host computer sending a content request for the content to the disk drive, wherein the content request does not include a watermark request;
the host computer sending an access request to a remote authorization source, wherein the access request includes identification information that uniquely identifies the disk drive;
the remote authorization source sending a decryption key to the host computer in response to the access request;
the host computer sending the decryption key received from the remote authorization source to the disk drive, and then, in response to the content request, and without a watermark request from an external device;
the disk drive decrypting the encrypted content using the decryption key, thereby generating the content;
the disk drive watermarking the content, thereby generating watermarked content that includes the content and a watermark that is embedded in the content and is detectable and uniquely identifies the disk drive so that the disk drive is traceable from the watermarked content; and
the disk drive sending the watermarked content to the host computer.

92. The method of claim 91, wherein the watermark alters samples in noise regions of an analog signal that represents the watermarked content and the altered samples indicate the watermark.

93. The method of claim 92, wherein the altered samples are every Nth sample of the analog signal.

94. The method of claim 92, wherein the altered samples are the Nth sample of every M samples of the analog signal.

95. The method of claim 92, wherein the altered samples each have a bit set due to the watermark.

96. The method of claim 91, wherein the disk drive does not send the content to the host computer unless the watermark is embedded in the content.

97. The method of claim 91, wherein the content is devoid of a watermark and the watermarked content is devoid of an additional watermark.

98. The method of claim 91, wherein the content includes an additional watermark before the content is sent to the disk drive, the watermarked content includes the watermark and the additional watermark, and the watermark is uniquely detectable and traceable apart from the additional watermark.

99. The method of claim 91, wherein the watermark is a serial number of the disk drive.

100. The method of claim 91, wherein the watermark is hidden in and hard to detect in the watermarked content.

\* \* \* \* \*